US010338452B2

(12) United States Patent
Bennett (10) Patent No.: US 10,338,452 B2
(45) Date of Patent: Jul. 2, 2019

(54) ELECTROMAGNETIC WAVELENGTH CONVERSION DEVICE

(71) Applicant: TRANSCEND LIGHTING INC., New York, NY (US)

(72) Inventor: Brian Bennett, New York, NY (US)

(73) Assignee: Transcend Lighting Inc., New York, NY (US)

( * ) Notice: Subject to any disclaimer, the term of this patent is extended or adjusted under 35 U.S.C. 154(b) by 0 days.

(21) Appl. No.: 14/821,133

(22) Filed: Aug. 7, 2015

(65) Prior Publication Data

US 2016/0041450 A1 Feb. 11, 2016

Related U.S. Application Data

(60) Provisional application No. 62/034,853, filed on Aug. 8, 2014.

(51) Int. Cl.
*G02F 1/35* (2006.01)
(52) U.S. Cl.
CPC ............... *G02F 1/353* (2013.01); *G02F 1/35* (2013.01); *G02F 2001/3505* (2013.01)
(58) Field of Classification Search
CPC .... G02F 1/35; G02F 1/353; G02F 2001/3505; H01L 33/50; H01L 33/502; H01L 33/60
See application file for complete search history.

(56) References Cited

U.S. PATENT DOCUMENTS

| 5,622,423 | A * | 4/1997 | Lee | F21L 4/02 362/102 |
| 6,357,889 | B1 * | 3/2002 | Duggal | F21V 3/0481 313/512 |
| 8,031,393 | B2 * | 10/2011 | Narendran | H01L 33/507 359/326 |
| 8,604,678 | B2 * | 12/2013 | Dai | F21V 9/16 313/112 |
| 8,866,182 | B2 * | 10/2014 | Wang | H01L 33/486 257/99 |
| 9,488,324 | B2 * | 11/2016 | Shum | F21V 17/105 |

(Continued)

FOREIGN PATENT DOCUMENTS

JP 2013008542 A * 1/2013 ............... F21S 2/00

*Primary Examiner* — Daniel Petkovsek
(74) *Attorney, Agent, or Firm* — Moritt Hock & Hamroff LLP; Bret P. Shapiro (57) ABSTRACT

Technologies are described for devices and methods to convert first wavelength electromagnetic waves to a second wavelength. The devices may comprise a light source to produce first electromagnetic waves of the first wavelength. The devices may comprise a reflector which may define an optical cavity around the light source and include a first and second end. The first end may be disposed around the light source. The reflector may reflect the first electromagnetic waves towards the second end. The devices may comprise a wavelength conversion component disposed at the second end which may absorb the first electromagnetic waves and emit second electromagnetic waves at the second wavelength. The devices may comprise a fixture housing disposed around the light source and the reflector. The devices may comprise a retaining component attachable to, and removable from, the fixture housing. The retaining component may secure the wavelength conversion component to the fixture housing.

14 Claims, 6 Drawing Sheets

(56) References Cited

U.S. PATENT DOCUMENTS

2009/0103296 A1    4/2009   Harbers et al.
2010/0259919 A1   10/2010   Khazi et al.
2012/0087103 A1    4/2012   Dai et al.
2012/0327663 A1* 12/2012   Doan ........................ F21V 9/08
                                                                 362/294

* cited by examiner

ELECTROMAGNETIC WAVELENGTH CONVERSION DEVICE

CROSS REFERENCE TO RELATED APPLICATIONS

This application claims priority to Provisional Application No. 62/034,853 filed Aug. 8, 2014, the entirety of which is hereby incorporated by reference.

BACKGROUND

This application relates to systems and methods for generating electromagnetic waves with a specific frequency or wavelength and thereafter converting the generated electromagnetic waves to a different frequency or wavelength.

Electromagnetic waves may have electric amplitudes varying at a specific frequency or wavelength. Biological and non-biological applications may require electromagnetic waves with a specific wavelength and/or may require electromagnetic waves of different wavelengths at different times. Light-emitting diode (LED) lamps may emit light in narrow bands of electromagnetic wavelengths. LED lamps may be made with a semiconductor and emit light with a color characteristic of the energy bandgap of the semiconductor.

SUMMARY

In some examples devices to convert electromagnetic waves of a first wavelength to electromagnetic waves of a second wavelength are described. The devices may comprise a light source configured to produce first electromagnetic waves. The first electromagnetic waves may have the first wavelength. The devices may comprise a reflector. The reflector may define an optical cavity around the light source. The reflector may include a first end and a second end. The first end may be disposed around the light source. The reflector may be configured to reflect and direct the first electromagnetic waves towards the second end. The devices may comprise a wavelength conversion component disposed at the second end of the reflector. The wavelength conversion component may be configured to absorb the first electromagnetic waves and emit second electromagnetic waves upon the first electromagnetic waves being incident upon the wavelength conversion component. The second electromagnetic waves may have the second wavelength, different from the first wavelength. The devices may comprise a fixture housing disposed around the light source and the reflector. The devices may comprise a retaining component. The retaining component may be attachable to, and removable from, the fixture housing. The retaining component may be effective to secure the wavelength conversion component to the fixture housing at the second end of the reflector.

In some examples, methods for converting wavelengths of electromagnetic waves are described. The methods may comprise securing a first wavelength conversion component to a fixture with a retaining component are described. The methods may comprise directing first electromagnetic waves from a light source towards the first wavelength conversion component The first electromagnetic waves may have a first wavelength. The methods may comprise causing second electromagnetic waves to be emitted from the first wavelength conversion component. The first wavelength conversion component may be effective to absorb the first electromagnetic waves and emit the second electromagnetic waves upon the first electromagnetic waves being incident upon the first wavelength conversion component. The second electromagnetic waves may have a second wavelength. The second wavelength may be different from the first wavelength. The methods may comprise removing the retaining component from the fixture. The methods may comprise removing the first wavelength conversion component from the fixture. The methods may further comprise securing a second wavelength conversion component to the fixture with the retaining component. The method may comprise directing third electromagnetic waves from the light source towards the second wavelength conversion component. The methods may comprise causing fourth electromagnetic waves to be emitted from the second wavelength conversion component. The second wavelength conversion component may be effective to absorb the third electromagnetic waves and emit the fourth electromagnetic waves upon the third electromagnetic waves being incident upon the second wavelength conversion component. The fourth electromagnetic waves may have a third wavelength. The third wavelength may be different from the first wavelength and the second wavelength.

In some examples, lighting fixtures for electromagnetic wavelength conversion are described. The lighting fixtures may comprise a light source. The light source may be configured to produce first electromagnetic waves. The first electromagnetic waves may have a first wavelength. The lighting fixtures may comprise a circuit board. The light source may be mounted on a first side of the circuit board. The lighting fixtures may comprise a heat sink. A first side of the heat sink may be mounted on a second side of the circuit board. The second side of the circuit board may be opposite the first side of the circuit board. The lighting fixture may comprise an active thermal management device. The active thermal management device may be mounted to a second side of the heat sink. The second side of the heat sink may be opposite the first side of the heat sink. The lighting fixture may comprise a reflector. The reflector may define an optical cavity around the light source. The reflector may include a first end and a second end. The first end may be disposed around the light source. The reflector may be configured to reflect and direct the first electromagnetic waves towards the second end. The lighting fixtures may comprise a fixture housing around the light source, the reflector, the circuit board, the heat sink, and the active thermal management device. An opening in the fixture housing may be at the second end of the reflector. The lighting fixture may comprise a retaining component. The retaining component may be attachable to, and removable from, the fixture housing. The retaining component may be effective to secure a wavelength conversion component to the opening of the fixture housing at the second side of the reflector. The wavelength conversion component may be configured to absorb the first electromagnetic waves and emit second electromagnetic waves upon the first electromagnetic waves being incident upon the wavelength conversion component. The second electromagnetic waves may have the second wavelength. The second wavelength may be different from the first wavelength.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

all arranged according to at least some embodiments described herein.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

It will be understood that any compound, material or substance which is expressly or implicitly disclosed in the specification and/or recited in a claim as belonging to a group or structurally, compositionally and/or functionally related compounds, materials or substances, includes individual representatives of the group and all combinations thereof.

Figure 1:
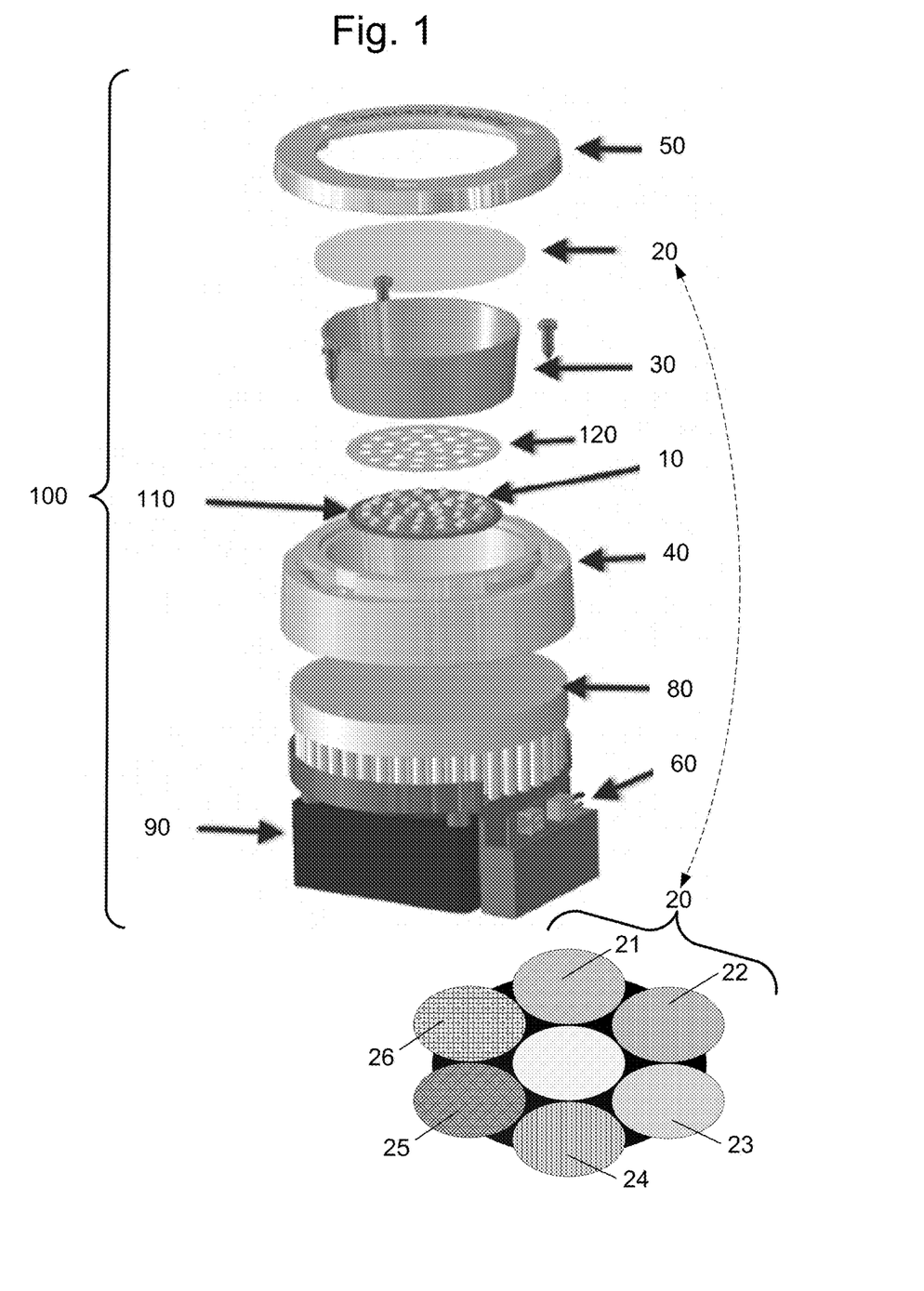
FIG. 1 is a side perspective blow up view of components of a device that can be utilized to implement electromagnetic wavelength conversion.

FIG. 1 is a side perspective blow up view of components of a device 100 that can be utilized to implement electromagnetic wavelength conversion, arranged in accordance with at least some embodiments presented herein. As discussed in more detail below, the electromagnetic waves generated by a light source may be converted to specific electromagnetic wavelengths.

Device 100 may include a light source 10, a circuit board 110, reflective material 120, a reflector 30, a wavelength conversion component 20, a fixture housing 40, a retaining component 50, drive electronics 60, a heat sink 80, and an active thermal management device 90. Light source 10 may be mounted to circuit board 110. Solder may mount light source 10 to circuit board 110. Reflective material 120 may adhere to circuit board 110 around light source 10. Circuit board 110 may be mounted to heat sink 80. Heat sink 80 may be mounted to active thermal management device 90. Active thermal management device 90 may draw heat away from heat sink 80. Reflector 30 may be placed around light source 10. Fixture housing 40 may be disposed around light source 10, circuit board 110, reflector 30, wavelength conversion component 20, and heat sink 80. Fixture housing 40 may also be disposed around active thermal management device 90. Drive electronics 60 may be mounted within fixture housing 40 or may be mounted remotely on the outside of fixture housing 40. Drive electronics 60, circuit board 110, light source 10 and active thermal management device 90 may be interconnected with copper wiring, solder, wire-to-board connectors, splices and/or wire nuts.

Light source 10 may be temperature sensitive. Heat sink 80 and active thermal management device 90 may transport thermal energy away from light source 10. Active thermal management device 90 may be a fan or a cooler.

Wavelength conversion component 20 may include a transparent material such as, for example, glass and/or plastic. Wavelength conversion component 20 may include phosphors, quantum dots or other wavelength conversion materials with the ability to Stokes shift higher energy shorter electromagnetic waves into lower energy longer electromagnetic waves or the ability to anti-Stokes shift lower energy longer electromagnetic waves into higher energy shorter electromagnetic waves. Materials with the ability to Stokes or anti-Stokes shift may convert a wavelength of electromagnetic waves directed at the material by absorbing the electromagnetic wave energy and consequently enter into an excited state. Materials with the ability to Stokes or anti-Stokes shift may release the energy from the excited state by emitting electromagnetic wave energy at a different wavelength based on characteristics, such as a bandgap, of the material. Wavelength conversion component 20 may include phosphors, quantum dots, or other wavelength conversion material adhered to one side of the transparent material. Phosphors may be a substance that exhibits the phenomenon of luminescence and may be used in fluorescent, metal halide, neon, and LED lamps. Quantum dots may be nanocrystals made of semiconductor materials and may also exhibit fluorescence. Wavelength conversion component 20 may include phosphors, quantum dots, or other wavelength conversion material mixed within the transparent material. Wavelength conversion component 20 may be configured as fibers, reflective components, and other form factors other than purely transmissive components. Wavelength conversion component 20 may include a phosphor wheel or slide and include multiple wavelength conversion subcomponents 21, 22, 23, 24, 25, and 26. Wavelength conversion subcomponents 21, 22, 23, 24, 25, and 26 may each be different wavelength conversion component materials and may each respectively convert a wavelength of electromagnetic waves directed at each respective subcomponent to a different respective wavelength of electromagnetic wave energy. Wavelength conversion component 20 may be adjacent to reflector 30 and may sit within an opening of fixture housing 40. Retaining component 50 may connect to fixture housing 40 and may secure wavelength conversion component 20, or one or more wavelength conversion subcomponents of a wavelength conversion component, within the opening of fixture housing 40. As shown in more detail below, reflector 30 placed around light source 10 may direct emitted electromagnetic waves from light source 10 towards secured wavelength conversion component 20.

Figure 2:
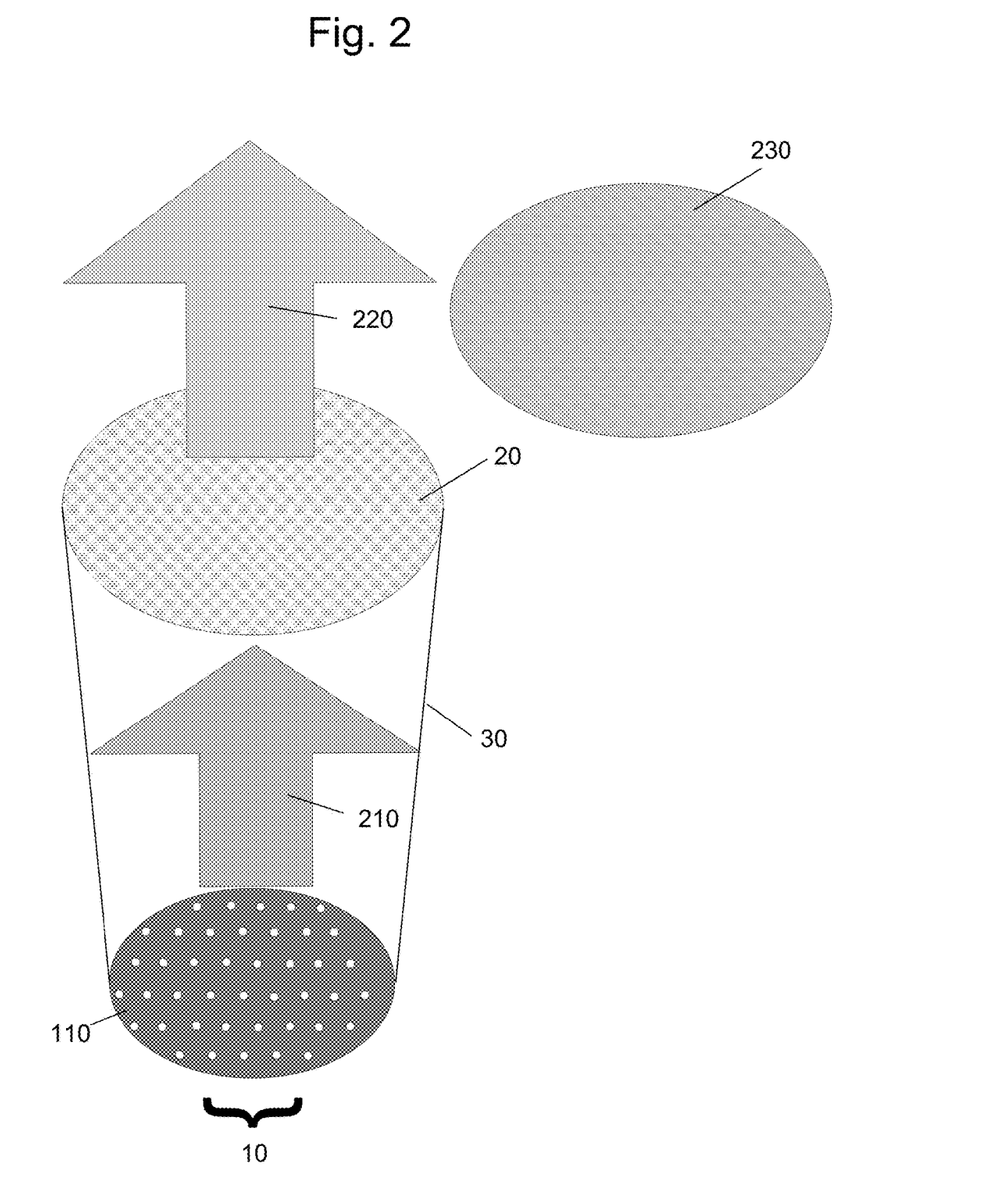
FIG. 2 is a schematic illustrating an example of a wavelength conversion component converting electromagnetic waves from a light source.

FIG. 2 is a schematic illustrating an example of wavelength conversion component 20 converting electromagnetic waves from light source 10, arranged in accordance with at least some embodiments presented herein. Those components in FIG. 2 that are labeled identically to components of FIG. 1 will not be described again for the purposes of clarity.

Light source 10 may generate electromagnetic waves 210. Light source 10 may generate electromagnetic waves 210 with a wavelength in a range of from about 10 nm to about 10,000 nm. Electromagnetic waves 210 may be directed towards wavelength conversion component 20. Reflector 30 may define a cylindrical or conical optical cavity from light source 10 to wavelength conversion material 20. Reflector 30 may be reflective, and may reflect and direct electromagnetic waves 210 emitted from light source 10 towards wavelength conversion material 20. Reflector 30 may be reflective paper, reflective metal, reflective paint, or any other reflective material. Reflector 30 may reflect greater than 90 percent of light emitted towards reflector 30. Electromagnetic waves 210 incident on the wavelength conversion component 20 may be reflected, transmitted or converted. When electromagnetic waves 210 are reflected or converted and re-emitted in a direction towards light source 10, reflector 30 may reflect the electromagnetic waves towards wavelength conversion component 20. Wavelength conversion component 20 may convert electromagnetic waves 210 into electromagnetic waves 220. Electromagnetic waves 220, converted by wavelength conversion component 20, may have a wavelength in a range of from about 10 nm to about 10,000 nm. Electromagnetic waves 210 may be higher energy electromagnetic waves or electromagnetic waves with a shorter wavelength than electromagnetic waves 220. Wavelength conversion component 20 may convert higher energy electromagnetic waves 210 into electromagnetic waves 220 at a desired wavelength.

In an example, electromagnetic waves 210 generated by light source 10 may be blue light and have a wavelength of 450 nm. 450 nm wavelength electromagnetic waves 210 may be directed towards wavelength conversion component 20. Wavelength conversion component 20 may convert 450 nm wavelength electromagnetic waves 210 into electromagnetic waves 220. Electromagnetic waves 220 may be red light and may have a wavelength of 660 nm, a longer wavelength than 450 nm wavelength electromagnetic waves 210. 660 nm wavelength electromagnetic waves 220 may have lower energy than 450 nm wavelength electromagnetic waves 210.

As discussed in more detail below, wavelength conversion material 20 may be located independent from light source 10 and may be configured to be removed and/or replaced with a different wavelength conversion component 230. Replacement of wave conversion component 20 with wave conversion component 230 may be accomplished without changing light source 10.

Figure 3:
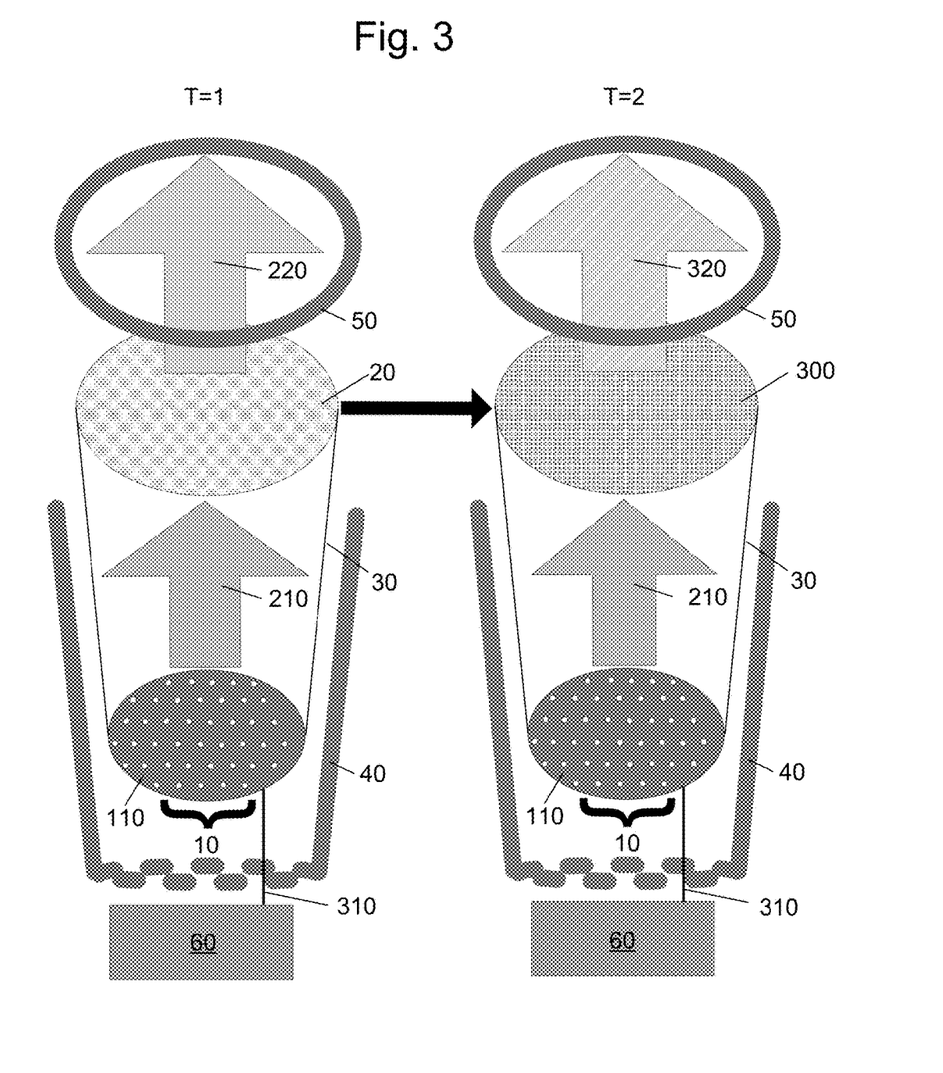
FIG. 3 is a schematic illustrating an example of removal and replacement of a wavelength conversion component.

FIG. 3 is a schematic illustrating an example of removal and replacement of a wavelength conversion component, arranged in accordance with at least some embodiments presented herein. Those components in FIG. 3 that are labeled identically to components of FIGS. 1-2 will not be described again for the purposes of clarity.

Light source 10 may convert electrical energy into electromagnetic waves 210. Circuit board 110 may hold the light source 10 in place and may also connect light source 10 to a power source of electrical energy. Light source 10 may be configured for alternating current operation. Drive electronics 60 may be configured to receive alternating current and provide electrical energy in the form of a current and a voltage to light source 10. Insulated copper wire 310 may carry electrical energy from drive electronics 60 to light source 10.

Retaining component 50 may be attachable to, and removable from, fixture housing 40 and may secure wavelength conversion component 20 in position in fixture housing 40. Removal of retaining component 50 may allow removal and/or replacement of wavelength conversion component 20 with a different wavelength conversion component 300.

For example, at a first time, T=1, retaining component 50 may be removed from fixture housing 40. Removal of retaining component 50 may allow for removal of wavelength conversion component 20 from fixture housing 40. At a second time, T=2, wavelength conversion component 300 may be positioned into fixture housing 40. Retaining component 50 may be secured onto fixture housing 40 and secure wavelength conversion component 300 into fixture housing 40. Wavelength conversion component 300 may convert electromagnetic waves 210 into electromagnetic waves 320. Electromagnetic waves 320 may have a different wavelength than electromagnetic waves 220. Removal of retaining component 50 and replacement of wavelength conversion component 20 or 320 may allow for different electromagnetic wavelengths to be produced from singular light source 10.

Figure 4:
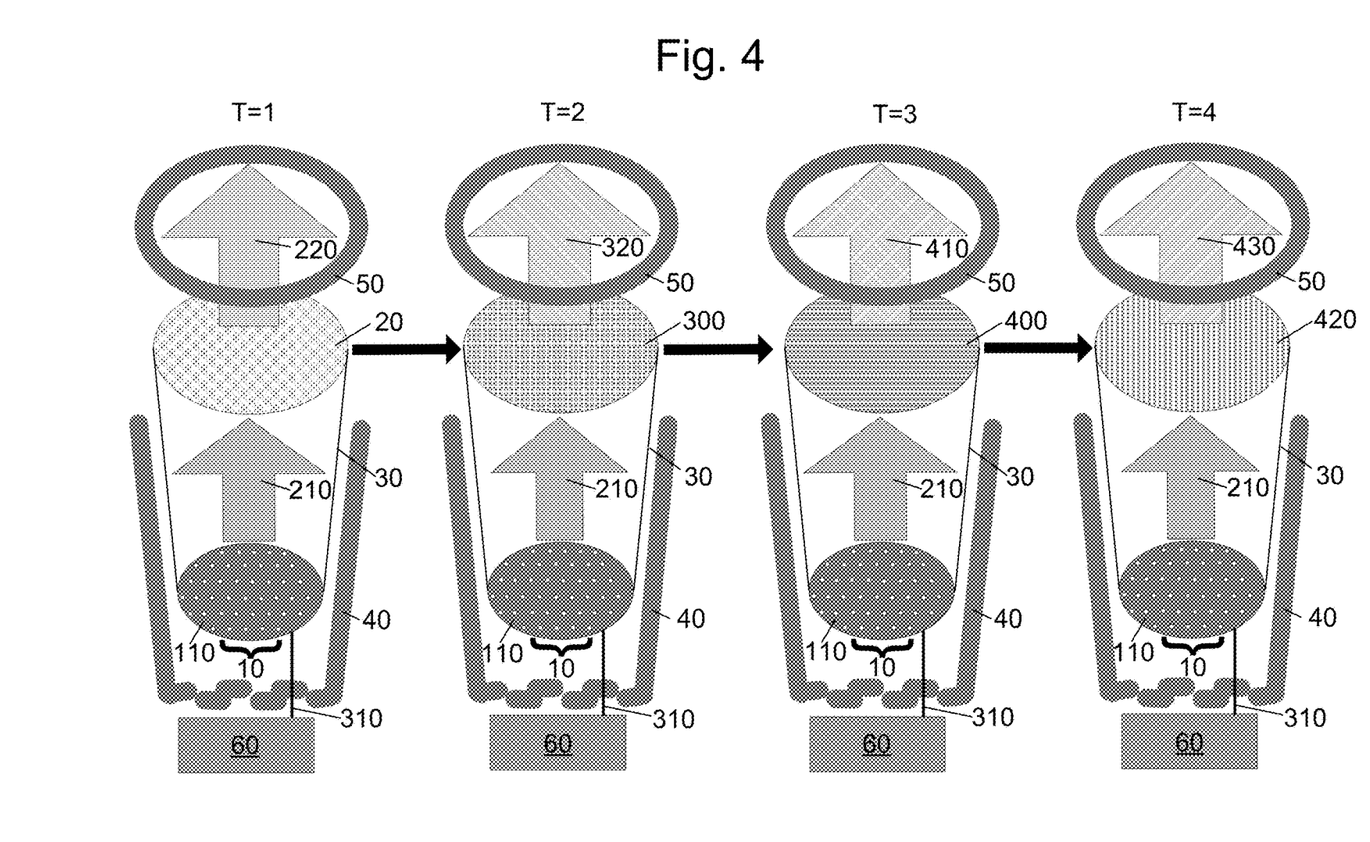
FIG. 4 is a schematic illustrating an example of multiple removals and replacements of different wavelength conversion components.

FIG. 4 is a schematic illustrating an example of multiple removals and replacements of different wavelength conversion components, arranged in accordance with at least some embodiments presented herein. Those components in FIG. 4 that are labeled identically to components of FIGS. 1-3 will not be described again for the purposes of clarity.

In an example, light source 10 may produce 450 nm wavelength electromagnetic waves 210. At a first time T=1, 550 nm electromagnetic wavelength waves may be required. Wavelength conversion component 20 may convert 450 nm wavelength electromagnetic waves 210 into 550 nm wavelength electromagnetic waves 220.

At a second time, T=2, 600 nm wavelength electromagnetic waves may be required. Retaining component 50 and wavelength conversion component 20 may be removed from fixture housing 40. Wavelength conversion component 300 may be placed into fixture housing 40 and secured with retaining component 50. Wavelength conversion component 300 may convert 450 nm wavelength electromagnetic waves 210 into 600 nm wavelength electromagnetic waves 320.

At a third time, T=3, 650 nm wavelength electromagnetic waves may be required. Retaining component 50 and wavelength conversion component 300 may be removed from fixture housing 40. Wavelength conversion component 400 may be placed into fixture housing 40 and secured with retaining component 50. Wavelength conversion component 400 may convert 450 nm wavelength electromagnetic waves 210 into 650 nm wavelength electromagnetic waves 410.

At a fourth time, T=4, 600-700 nm wavelength electromagnetic waves may be required. Retaining component 50 and wavelength conversion component 400 may be removed from fixture housing 40. Wavelength conversion component 420 may be placed into fixture housing 40 and secured with retaining component 50. Wavelength conversion component 420 may convert 450 nm wavelength electromagnetic waves 210 into 600-700 nm wavelength electromagnetic waves 430.

As shown in the example, electromagnetic waves of wavelengths of 550 nm, 600 nm, 650 nm, and 600-700 nm may be produced from light source 10 through conversion by wavelength conversion components 20, 300, 400, and 420 respectively.

Figure 5:
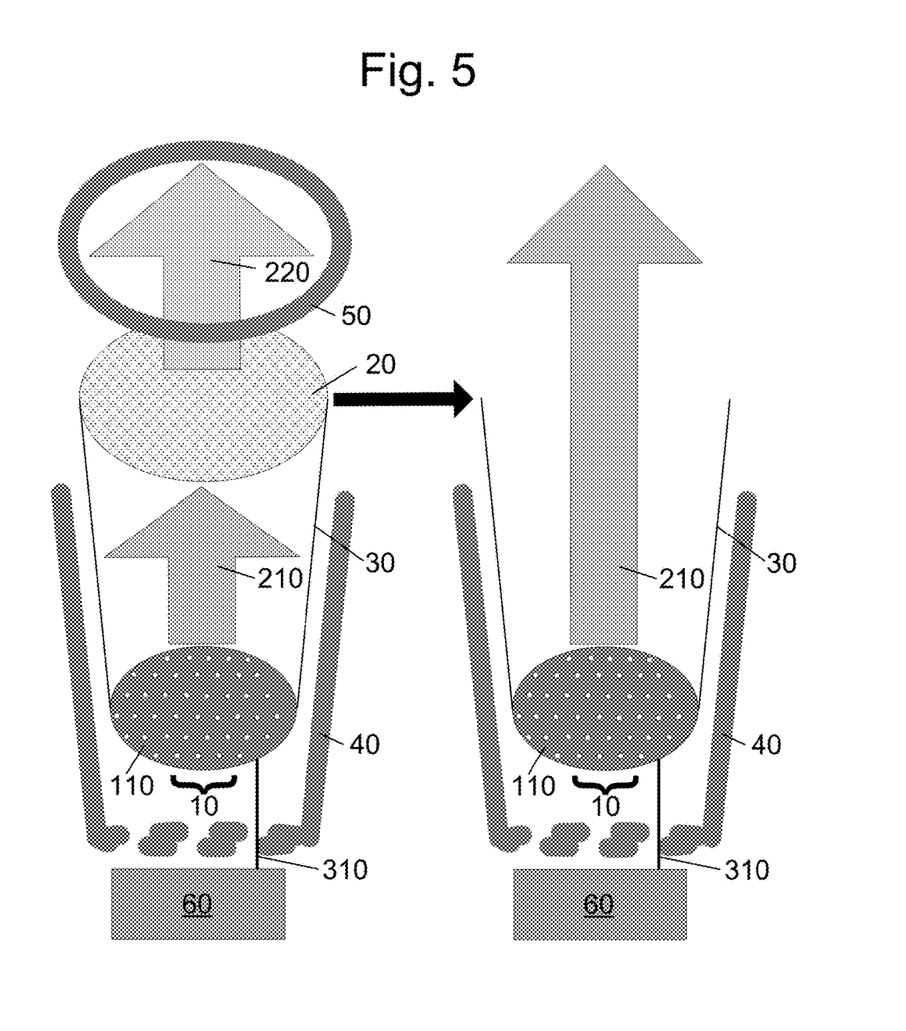
FIG. 5 is a schematic illustrating an example of removal of a wavelength conversion component.

FIG. 5 is a schematic illustrating an example of removal of a wavelength conversion component, arranged in accordance with at least some embodiments presented herein.

Those components in FIG. 5 that are labeled identically to components of FIGS. 1-4 will not be described again for the purposes of clarity.

In another example, light source 10 may produce 450 nm wavelength electromagnetic waves 210. An output of 450 nm wavelength electromagnetic waves may be required. Wavelength conversion component 20 may convert 450 nm wavelength electromagnetic waves 210 into 550 nm wavelength electromagnetic waves 220. Retaining component 50 and wavelength conversion component 20 may be removed from fixture housing 40 so that no conversion is performed on electromagnetic waves 210, resulting in an output of required 450 nm wavelength electromagnetic waves.

Figure 6:
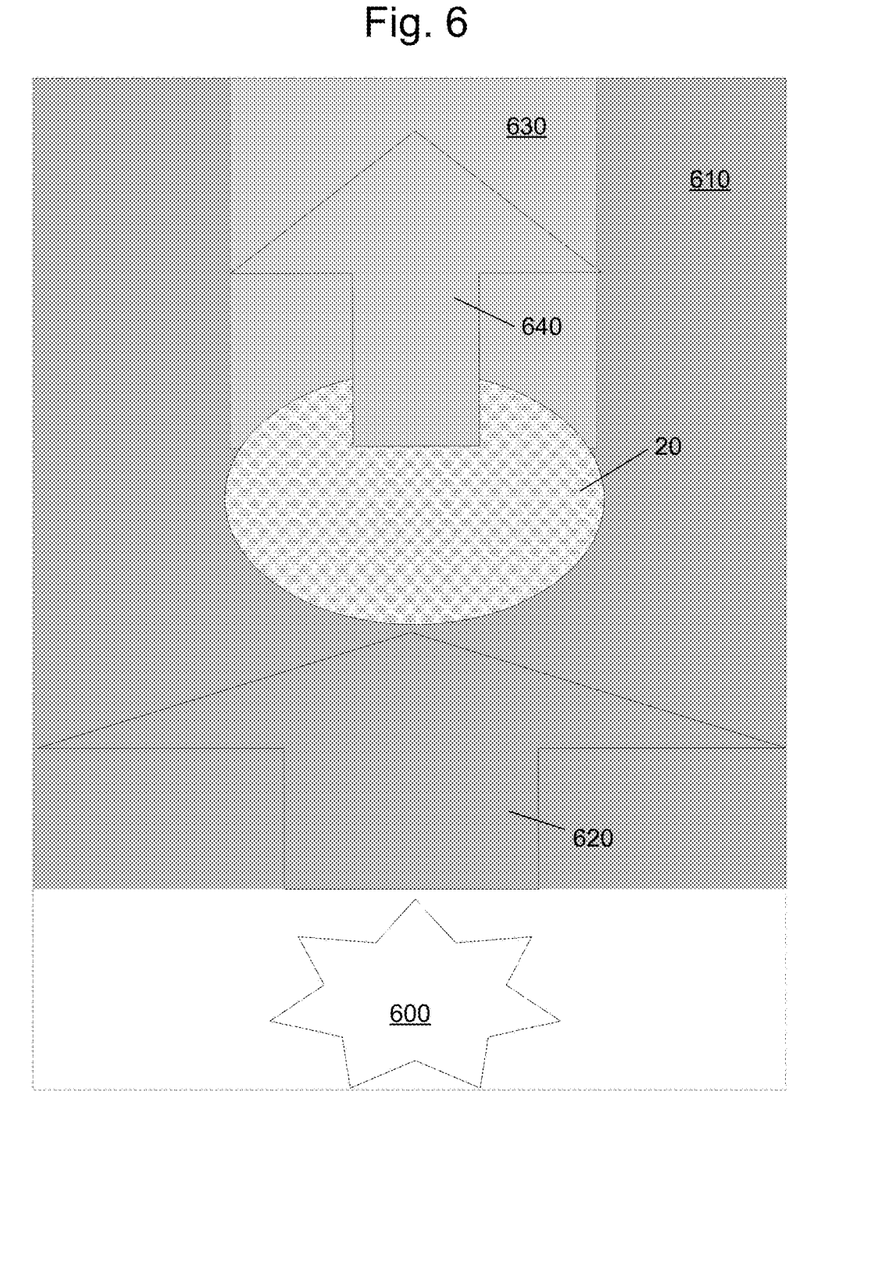
FIG. 6 is a schematic illustrating an example of a wavelength conversion component arranged to convert electromagnetic waves from an independent light source.

FIG. 6 is a schematic illustrating an example of a wavelength conversion component arranged to convert electromagnetic waves from an independent light source, arranged in accordance with at least some embodiments presented herein. Those components in FIG. 6 that are labeled identically to components of FIGS. 1-5 will not be described again for the purposes of clarity.

In an example, a light source 600 may illuminate an area 610. Light source 600 may be sunlight or any other light source illuminating area 610. Light source 600 may produce 450 nm electromagnetic waves 620. An output of 550 nm wavelength electromagnetic waves may be required in area 630. Wavelength conversion component 20 may convert 450 nm wavelength electromagnetic waves 620 into 550 nm wavelength electromagnetic waves 640. Wavelength conversion component 20 may be positioned within area 610 such that when 450 nm wavelength electromagnetic waves 620 are incident onto wavelength conversion component 20 they are converted into 550 nm wavelength electromagnetic waves 640 in area 630. Wavelength conversion component 20 may be positioned and secured by any securing device, such as a component housing or a fixture.

A system in accordance with the present disclosure may enable a user to generate specific electromagnetic wavelengths from a singular light source. A user may be able to easily change an output wavelength of electromagnetic waves from a light source without having to change or replace the light source.

A system in accordance with the present disclosure may enable a user to save energy when emitting certain electromagnetic wavelengths for a light source. For example, 450 nm wavelength blue light LEDs may have typical conversion efficiencies of up to 60% at 85° C. junction temperature. In contrast, 660 nm wavelength deep red LEDs may have typical conversion efficiencies of up to 35% at 85° C. junction temperature. A wavelength conversion process of converting light generated at 450 nm wavelength electromagnetic waves to 660 nm wavelength electromagnetic waves may provide energy saving when the conversion from 450 nm wavelength electromagnetic waves to 660 nm wavelength electromagnetic waves is greater than 58% efficient.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A device to convert electromagnetic waves of a first wavelength to electromagnetic waves of a second wavelength, the device comprising:

a light source configured to produce first electromagnetic waves, wherein the first electromagnetic waves have the first wavelength;

a reflector, wherein the reflector includes a first end and a second end, the first end is disposed around the light source, and the reflector is configured to reflect and direct the first electromagnetic waves towards the second end;

a wavelength conversion component with a first side and a second side, the first side of the wavelength conversion component disposed at, and in contact with, the second end of the reflector, the wavelength conversion component in combination with the reflector, effective to form an optical cavity for the light source, the wavelength conversion component consisting of a wavelength conversion material adhered to a transparent material, wherein upon the first electromagnetic waves being incident upon the wavelength conversion component, the wavelength conversion material is configured to:

absorb the first electromagnetic waves;
enter into an excited state; and
release energy from the excited state by emitting second electromagnetic waves, wherein the second electromagnetic waves have the second wavelength, different from the first wavelength;

a fixture housing disposed around the light source, the wavelength conversion component, and the reflector; and a retaining component, wherein the retaining component is configured to be attachable to, and removable from, the fixture housing, and is effective to be in contact with the second side of the wavelength conversion component to secure the wavelength conversion component to the fixture housing at the second end of the reflector.

2. The device of claim 1, wherein the first wavelength is from about 10 nm to about 10,000 nm.

3. The device of claim 1, wherein the second wavelength is from about 10 nm to about 10,000 nm.

4. The device of claim 1, wherein the second wavelength is from about 495 nm to about 570 nm.

5. The device of claim 1, wherein the second wavelength is from about 570 nm to about 590 nm.

6. The device of claim 1, wherein the second wavelength is from about 590 nm to about 620 nm.

7. The device of claim 1, wherein the second wavelength is from about 620 nm to about 750 nm.

8. The device of claim 1, wherein the wavelength conversion component includes a material with the ability to Stokes shift higher energy, shorter electromagnetic waves into lower energy, longer electromagnetic waves.

9. The device of claim 1, wherein the wavelength conversion component includes phosphors and/or quantum dots.

10. The device of claim 1, wherein the wavelength conversion component includes a transparent material with phosphors and/or quantum dots adhered to one side of the transparent material.

11. The device of claim 1, wherein the wavelength conversion component includes a transparent material with phosphors and/or quantum dots mixed within the transparent material.

12. The device of claim 1, wherein the reflector includes reflective paper, reflective metal, and/or reflective paint.

13. The device of claim 1, the device further comprising:
a circuit board, wherein the light source is mounted on a first side of the circuit board;

a heat sink, wherein a first side of the heat sink is mounted on a second side of the circuit board, the second side of the circuit board being opposite the first side of the circuit board;

an active thermal management device, wherein the active thermal management device is mounted to a second side of the heat sink, the second side of the heat sink being opposite the first side of the heat sink; and the fixture housing is further disposed around the circuit board, the heat sink, and the active thermal management device.

14. The device of claim 13, wherein the active thermal management device is a fan or a cooler.

* * * * *